Nov. 21, 1933.  R. LUTHI  1,935,646
CAN BODY SOLDERING APPARATUS
Filed Aug. 10, 1929
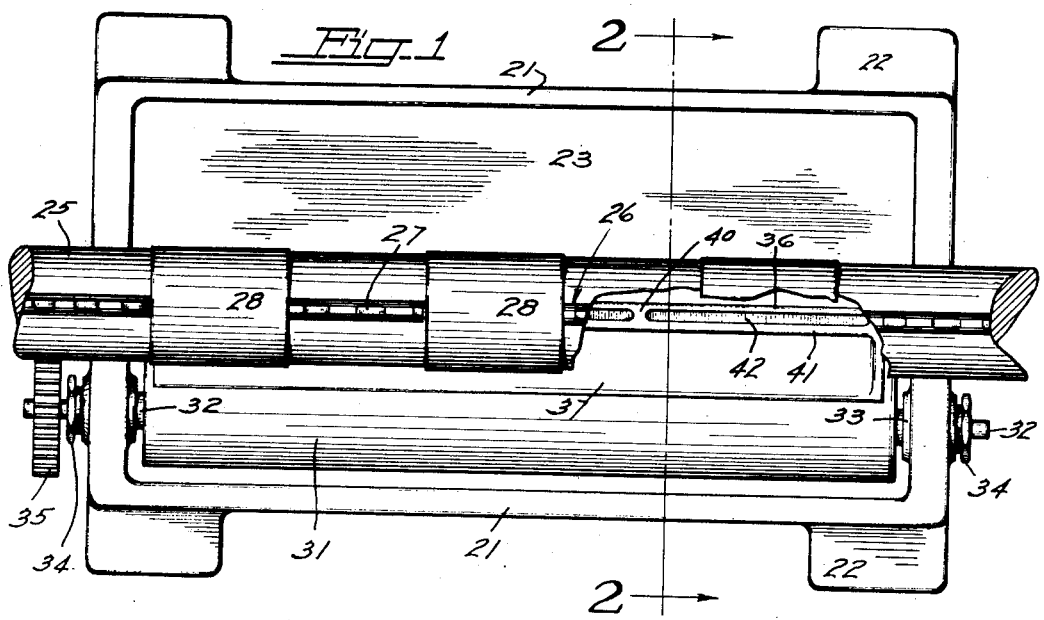
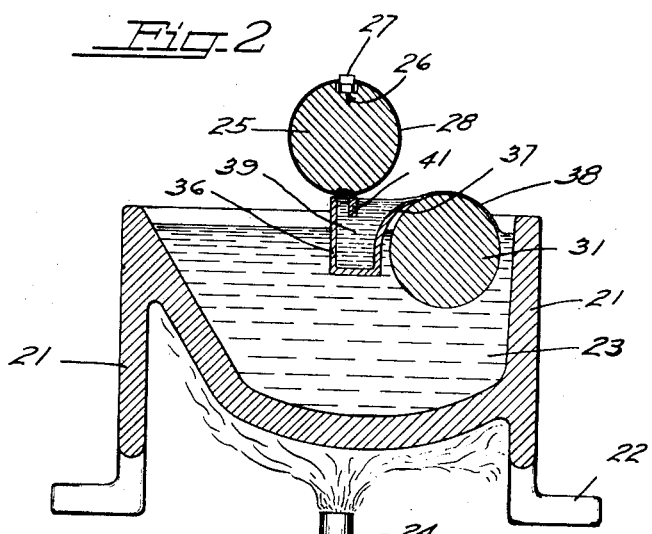
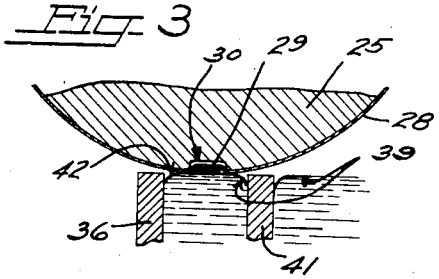
INVENTOR
Robert Luthi
BY John C. Carpenter
ATTORNEY Patented Nov. 21, 1933

1,935,646

UNITED STATES PATENT OFFICE 1,935,646

CAN BODY SOLDERING APPARATUS

Robert Luthi, Newark, N. J., assignor to American Can Company, New York, N. Y., a corporation of New Jersey Application August 10, 1929. Serial No. 384,920

6 Claims. (Cl. 113—60)

The present invention relates to a soldering apparatus of the solder bath type and has particular reference to such an apparatus wherein can bodies are conveyed along and in contact with an area of molten solder.

The principal object of the present invention is the provision of a soldering apparatus provided with improved means for supplying a proper amount of molten solder into a predetermined position for contact with a can body conveyed thereover.

A further important object of the invention is the provision of an improved solder feed roller and scraper located in a solder bath insuring the continuous transfer of a proper amount of molten solder from the solder bath into a tank positioned therein.

A further important object of the invention is the provision of a solder tank having means therein for restricting an area of molten solder for application to a can body and having an improved scraper for operating with a feed roller supplying molten solder to the restricted area in the tank.

Numerous other objects and advantages of the invention will be apparent as it is better understood from the following description, which, taken in connection with the accompanying drawing, discloses a preferred embodiment thereof.

Referring to the drawing:—

Figure 1 is a plan view, parts broken away, of a solder bath, a solder horn carrying can bodies and associated mechanisms embodying the present invention.

Fig. 2 is a transverse sectional view taken substantially along line 2—2 in Fig. 1.

Fig. 3 is a fragmentary sectional view of a part of a can body arranged on a solder horn showing the application of solder to the side seam thereof.

The apparatus of the present invention comprises a solder bath 21 formed with supporting feet 22 mounted in any usual and preferred manner. The solder bath is adapted to contain solder 23 maintained in a molten condition by application of heat from a suitable heat source such, for example, as a gas burner 24 located preferably beneath the solder bath 21.

A solder horn 25 extends above and in a longitudinal position relative to the solder bath 21 being supported in any proper manner. The solder horn 25 is provided with a longitudinal groove 26 cut in its upper surface in which moves a conveyor chain 27, of the usual link chain type. The chain 27 is adapted to convey can bodies 28 along the solder horn 25 and over the solder bath 21. When the operation of soldering applies to a can body side seam 29, this seam is positioned at the bottom and may move in a groove formed in the under side of the horn 25.

A solder feed roller 31 is positioned within the solder bath 21 and is partially submerged in the solder 23. Said roller 31 has a smooth outer surface and is mounted on a horizontal shaft 32 journaled for rotation in suitable bearings 33 formed in the end walls of the solder bath 21, the shaft 32 being provided with stuffing boxes 34 which form a liquid-tight joint between the bearing 33 and the shaft 32 and which permit the latter to rotate at the same time preventing escape of the solder 23 through the joint. Shaft 32 is rotated in proper synchronism with the travel of the conveyor chain 27 in any usual and preferred manner, a spur gear 35 being secured to one end of the shaft 32 for this purpose.

A solder tank 36 is mounted within the solder bath 21 and is positioned adjacent the solder roller 31 and is elevated above said bath so that the solder in the tank is accessible by a cam body moving over the bath 21, the tank extending practically the length of the solder bath and being positioned directly beneath the solder horn 25. One side wall of the tank 36 is outwardly projected in a circular form to provide a scraper 37, the forward edge of which engages a film of solder 38 carried up by the solder feed roller 31 as it is rotated in counter-clockwise direction (Fig. 2) within the solder 23. This scraper 37 insures proper feeding of the solder to the tank 36 and evenly distributes the same within the tank to form a solder area 39.

Inasmuch as the solder 23 within the solder bath 21 is maintained in a molten condition by the heater element 24, roller 31 located in the solder is likewise maintained at a high temperature, this insuring the proper heat for keeping the film of solder 38 fluid at the proper consistency for soldering. As illustrated in Fig. 2, tank 36 is partially submerged in the solder 23 and the heat of the solder is thus transmitted by conduction to the tank 36 and to the solder 39 therein, this insuring the proper fluidity and consistency of the solder for the soldering operation.

Tank 36 is provided with a bridge member 41 which is an integral part of the tank being connected at intervals with one side wall thereof by means of webs 40. This member 41 cooperates with the side wall of the tank 36 to enclose and provide a trough 42 setting off a zone of quiescence for the solder. In height this bridge member 41 extends only a short distance beneath the surface of the solder 39 within the tank 36 and the constant supply of fresh solder brought into the tank by the feed roller 31 flows freely into the body of solder passing under the bridge 41 into the soldering trough 42. Any excess of solder overflows the walls of the tank 36 and drains back into the solder bath 21 there being such an excess when can bodies cease to pass along the horn, providing that roller 31 is operating. Normally the passing can bodies remove an amount of solder equivalent to the solder fed into the tank 36.

The can body 28 passing over the solder horn 25 is brought into position for soldering, as illustrated in Fig. 3. Owing to capillary attraction, the solder trough 42 has its solder surface slightly elevated above the retaining walls of the tank 36 (Fig. 3) and this elevated surface is engaged by the can body conveyed along the horn 25 and solder is thus applied to a side seam 29 or other suitable part of the can body.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a soldering apparatus, in combination a tank for containing melted solder, a bridge member mounted within and at the surface of said tank and spaced away from the bottom of the tank, and defining at one side of the bridge member an elongated and elevated delivery surface of solder when the tank is filled with the same, and means for supplying melted solder to said tank at the other side of the bridge member, the solder so supplied passing under the bridge member to take the place of solder which is delivered from said elongated surface.

2. In a soldering apparatus, in combination a tank for containing melted solder, a bridge member mounted within and at the surface of said tank and spaced away from the bottom of the tank, and defining at one side of the bridge member an elongated and elevated delivery surface of solder when the tank is filled with the same, and means for supplying melted solder to said tank at the other side of the bridge member, the solder so supplied passing under the bridge member to take the place of solder which is delivered from said elongated surface, said means comprising a solder bath enclosing said tank, a feed roller in said bath, and a scraper bearing on said roller and leading to said tank.

3. In a soldering apparatus, a tank for containing melted solder, a bridge member arranged adjacent the open top of said tank, and forming with the wall of said tank an open bottom compartment, and adapted to define at one side of the bridge member a narrow and elongated surface of the solder when the tank is filled with the same, and means for constantly supplying solder to said tank at the other side of the bridge member, the melted solder having access to said narrow surface by passing through the bottom of said compartment.

4. In a soldering apparatus, a tank within a tank, both adapted to contain molten solder, a smooth surfaced solder roll adapted to transfer solder from the outer tank to the inner, and a bridge member within said inner tank forming therewith a restricted compartment from which solder is adapted to be applied to a can body moving over said compartment, the solder on both sides of the bridge being in communication with each other under the bridge, and said bridge causing the surface of the solder restricted thereby to elevate itself for ready application to the solder roll.

5. In a soldering apparatus, an outer tank, an inner and elevated tank within said outer tank, both tanks adapted to contain molten solder, a smooth surfaced solder roll adapted to transfer a film of solder from the outer tank to the inner tank, a scraper associated with said inner tank to direct said film from said roll into said inner tank, and means for dividing said inner tank into two open bottom compartments.

6. In a soldering apparatus, in combination, an elevated tank for containing melted solder, one side of said tank having a scraper and the other side of the tank having a bridge separating a quiescent delivery space for the solder from the space into which the solder flows, the solder in both spaces being a single body with the solder under the bridge, a feed roller for delivering solder to said scraper, and a solder bath enclosing said tank and roller, said roller having the greater part of its surface immersed in said solder bath.

ROBERT LUTHI.